No. 619,215. Patented Feb. 7, 1899.
W. P. PHILLIPS.
WATER GAGE FOR STEAM BOILERS.
(Application filed Feb. 10, 1898.)
(No Model.)
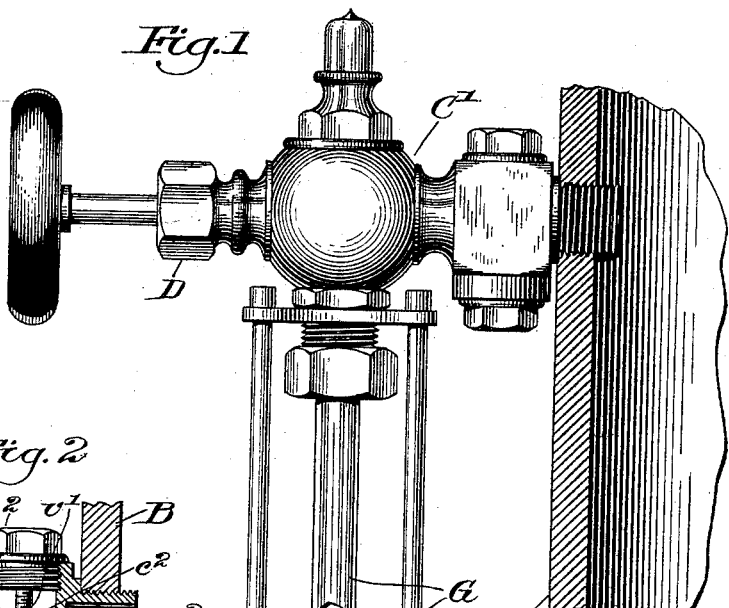
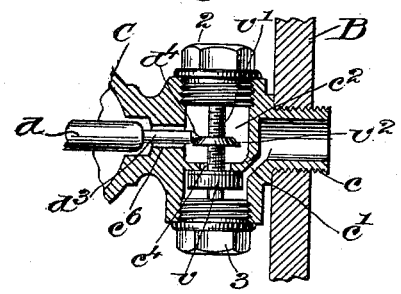
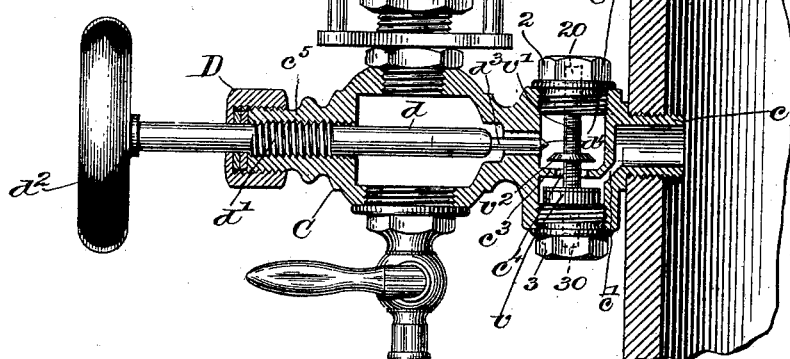
Witnesses:
A. C. Harmon
Edward F. Allen.
Inventor.
William P. Phillips.
by Gregory
attys.

UNITED STATES PATENT OFFICE.

WILLIAM P. PHILLIPS, OF BOSTON, MASSACHUSETTS.

WATER-GAGE FOR STEAM-BOILERS.

SPECIFICATION forming part of Letters Patent No. 619,215, dated February 7, 1899.

Application filed February 10, 1898. Serial No. 669,789. (No model.)

*To all whom it may concern:*

Be it known that I, WILLIAM P. PHILLIPS, of Boston, county of Suffolk, State of Massachusetts, have invented an Improvement in Water-Gages for Steam-Boilers, of which the following description, in connection with the accompanying drawings, is a specification, like letters and numerals on the drawings representing like parts.
This invention relates to water-gages for steam-boilers; and it has for its object the production of means for automatically cutting off communication between the boiler and the gage upon breakage or fracture of the gage-glass, thus preventing the dangers attendant upon such accidents from escaping steam and boiling water.

Figure 1, in partial section and side elevation and centrally broken out to save space, represents a water-gage embodying my invention; and Fig. 2 is a sectional detail of one of the controlling-valves to be described.

Referring to Fig. 1, the boiler-shell is represented at B, having an attached water-gage connected therewith above and below the water-line, the gage comprising, essentially, the gage glass or tube G and the upper and lower cases C C', and inasmuch as said valve-cases are alike only one of them will be described in detail. The valve-case is shown as having a threaded nipple $c$ to be screwed into the boiler-shell and communicating by a passage $c'$ with a chamber $c^2$ in the case, a transverse partition $c^3$ having an inlet-port $c^4$, by which the fluid (water or steam, as the case may be) passes through the valve-case into the gage-glass G. The chamber $c^2$ has threaded ends closed by suitable screw nuts or caps 2 3, which latter have axial recesses 20 30, (see dotted lines, Fig. 1,) into which enter the ends of the valve-stem $v'$, shown as a threaded rod screwed into the valve $v$ and extended on opposite sides thereof. The valve is thus guided in its movement toward or from the valve-seat formed by the partition $c^3$.

A flange or collar $v^2$ is mounted on the valve-stem at the opposite side and above the partition, and said flange has a preferably beveled periphery, the normal position of the valve and flange being shown in Fig. 1, the weight of the valve acting under normal conditions to maintain it unseated and permit free communication between the boiler and gage-glass through the port $c^4$. Should the normal condition of the apparatus be changed, however, as by breakage or fracture of the glass tube, the pressure on the flange or collar $v^2$ will lift it and the valve to bring the latter against its seat and close the passage through the valve-case.

In Fig. 2 the valve is shown as seated as it would be after breakage of the tube G, and after the insertion of a new tube it is necessary to provide means for unseating the valve, which is held firmly seated by the boiler-pressure on its under side. To effect this the outer end of the valve-case is provided with an interiorly-threaded extension $c^5$, through which is extended an actuator, shown as a shaft $d$, threaded at $d'$ and provided with a hand-wheel $d^2$ or other device by which it may be operated manually. The inner side of the actuator is reduced at $d^3$ to pass through an opening $c^6$ in the side wall of the valve-chamber $c^2$, and I prefer to bevel the tip of the actuator, as at $d^4$.

When the valve is seated, as shown in Fig. 2, the flange $v^2$ is lifted into position opposite the end of the actuator $d$, so that when the latter is moved inward it will act upon the flange and force it downward, carrying with it the valve-stem and valve and unseating the latter. As soon as the valves in the upper and lower valve-cases are unseated the equilibrium of pressure can be established, and the valves will be held off of their seats by gravity, as before, and then the actuators are withdrawn to their normal position, Fig. 1, out of the path of movement of the pistons $v^2$. Suitable bearing-nuts D on the extensions $c^5$ of the valve-cases prevent the escape of steam or water around the actuators.

The flanges $v^2$ and valves $v$ can be readily adjusted on the threaded valve-stems relative to each other and to the parts with which they coöperate.

In order that the valves shall remain unseated by gravity, they are made unusually heavy, and the areas of the flanges are large enough to effect the movement of the valves up against their seats upon fracture or breakage of the glass or the opening of the blow-off cock, which would tend to establish circulation in the apparatus.

When the actuator is moved inward to its full extent, its larger portion serves to close the opening $c^6$, and thus the actuator forms a positive stop-valve to prevent passage of steam or water from the boiler to the glass.

Having fully described my invention, what I claim as new, and desire to secure by Letters Patent, is—

1. In a water-gage, the valve-case having an inlet-port, a controlling-valve having an attached stem, a flange or collar on the stem, and an independent, manually-operated actuator mounted in the case, adapted to be brought into engagement with said flange or collar to move the valve-stem longitudinally and unseat the valve.

2. In a water-gage, the valve-case having an inlet-port, a controlling gravity-actuated valve having an attached stem, a flange or collar on the stem, and an independent, manually-operated actuator mounted in the case, and having a beveled end, adapted to be brought into engagement with the flange or collar to thereby move the valve-stem longitudinally and unseat the valve.

3. In a water-gage, the valve-case having an inlet-port, a controlling-valve having an attached stem, a flange or collar on the stem, having a beveled periphery, and an independent actuator adapted to be manually moved into engagement with the flange or collar, to move the valve-stem longitudinally and thereby unseat the valve.

4. In a water-gage, the valve-case having an inlet-port, a controlling-valve therefor normally maintained unseated by gravity, a valve-stem having an adjustable flange or collar thereon, and an independent actuator adapted to be manually moved into engagement with said flange or collar, to thereby move the valve from its seat against boiler-pressure.

5. In a water-gage, the valve-case having an inlet-port, a gravity controlling-valve at one side of the port and provided with a valve-stem extended therethrough, a beveled flange or collar on said stem at the opposite side of the port, and an independent rotatable longitudinally-movable actuator mounted in the valve-case, to engage the beveled flange or collar and force the valve from its seat, said actuator also serving as a positive stop-valve.

6. In a water-gage, the valve-case having a chamber, an inlet-port communicating therewith, a gravity-actuated controlling-valve for said port, having an oppositely-extended stem, guides for the stem, a beveled flange or collar on said stem, said flange or collar and valve being located above and below the port respectively, and an independent manually-movable actuator having a beveled end to engage and move the flange or collar to thereby force the valve from its seat.

In testimony whereof I have signed my name to this specification in the presence of two subscribing witnesses.

WILLIAM P. PHILLIPS.

Witnesses:
 JOHN C. EDWARDS,
 AUGUSTA E. DEAN.